No. 736,007. Patented August 11, 1903.

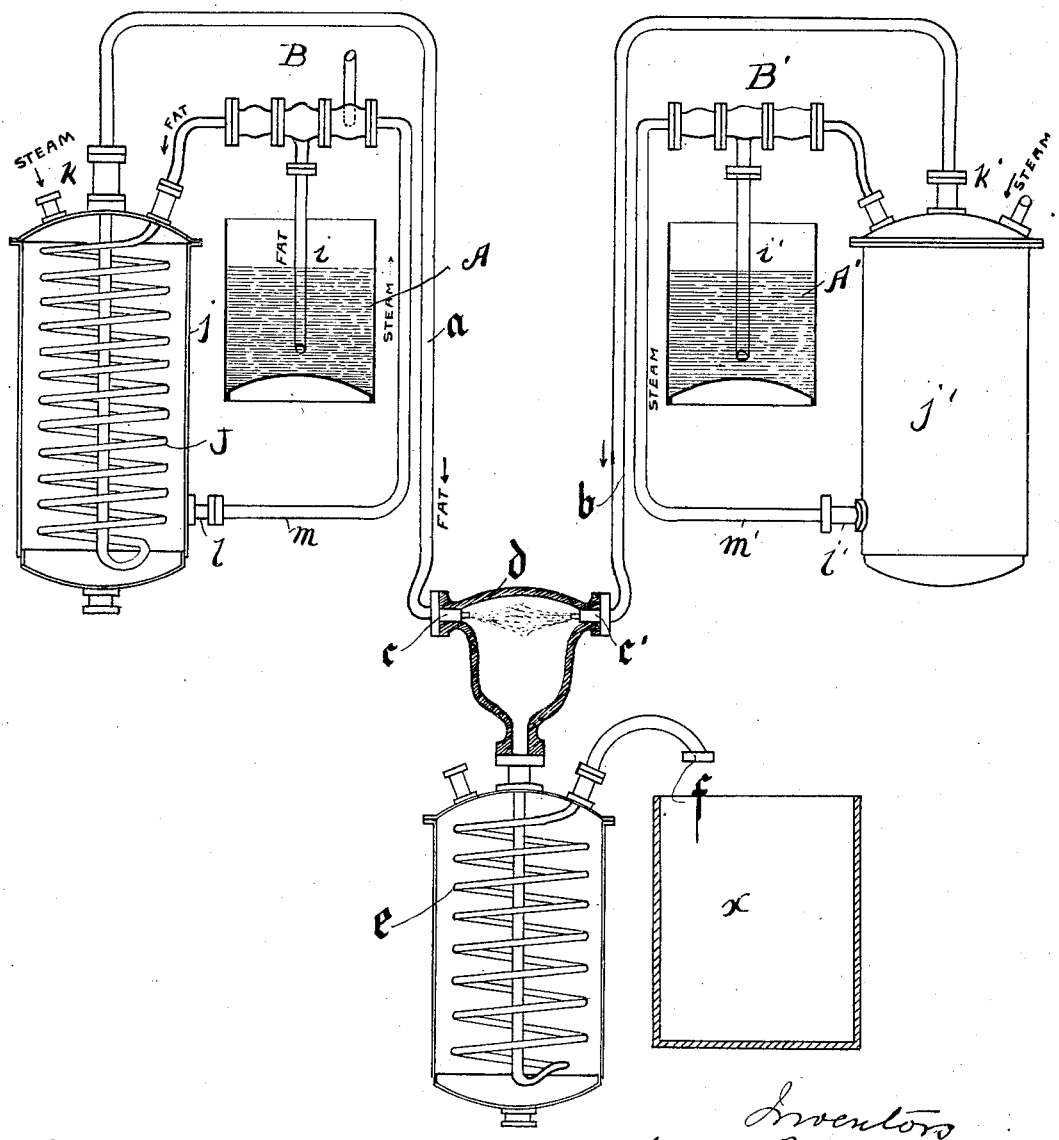

UNITED STATES PATENT OFFICE.

FRITZ PERRELET AND KARL BECKER, OF OFFENBACH-ON-THE-MAIN, GERMANY.

METHOD OF DECOMPOSING TALLOW, &c.

SPECIFICATION forming part of Letters Patent No. 736,007, dated August 11, 1903.

Application filed January 20, 1903. Serial No. 139,820. (No specimens.)

*To all whom it may concern:*

Be it known that we, FRITZ PERRELET and KARL BECKER, subjects of the German Emperor, residing and having our post-office address at 24 Ludwigstrasse, Offenbach-on-the-Main, Germany, have invented certain new and useful Improvements in Decomposing Tallow and the Like, of which the following is a specification.

The objects sought to be attained by our invention are to expedite and cheapen the decomposition of fats, to carry on the process continuously instead of intermittently, as is the case where specified charges are decomposed, to avoid the use of large metallic chambers within which to decompose the fat, and generally to improve upon the processes heretofore known.

The invention will be fully described hereinafter, reference being had to the accompanying drawing, which shows one form of apparatus capable of decomposing fat in accordance with our improved process.

The fat may be contained in an open vessel A, from which it is forced by any suitable means, as an injector B, through a heater. In the present case the heater is shown as a coil J, one end of which is connected to the injector B and the other end to a conduit $a$. The coil is inclosed in a casing $j$, provided with a steam-inlet $k$ and a steam-outlet $l$, the latter being connected to the injector B by a pipe $m$. A pipe $i$ leads from the injector B into the tank A. The highly-heated fat under considerable pressure flows through the conduit $a$ to a nozzle $c$, from which it issues, preferably in a finely-divided condition, (in the form of a spray, for instance,) into a closed chamber $d$. The decomposing material may be contained in a tank A', from whence it is forced by an injector B' into and through a coil (not shown, but similar to that in the casing $j$) in a casing $j'$ and through a conduit $m'$ to a nozzle $c'$, which discharges into the chamber $d$. The casing $j'$ is provided with a steam-inlet $k'$ and a steam-outlet $l'$, the latter being connected to the injector B' by a pipe $m'$. A pipe $i'$ leads from the injector B' into the tank A'. Highly-heated decomposing matter is forced under pressure through the conduit $b$ to another nozzle $c'$, from which it issues, also preferably in a finely-divided condition, into the chamber $d$, where it becomes intimately mixed with the heated fat. The incoming currents of fat and decomposing matter will preferably intersect each other, and as both are flowing under considerable pressure they will become intimately mingled, and if the proportion of fat and decomposing matter entering the chamber $d$ be properly regulated the decomposition of all the fat entering the chamber $d$ will be effected in a perfect manner. From the chamber $d$ the decomposed fat will flow through a coil in the heating-chamber $e$ through the nozzle $f$ to a settling-tank X, where the natural separation of the glycerin will occur.

Any suitable decomposing material may be employed, as steam, cream of lime, acid, &c.

While we prefer to introduce the fat and decomposing matter into the chamber $d$ in a finely-divided condition, it is not absolutely essential. It is, however, necessary that the currents of fat and decomposing matter shall be kept independent of each other until they enter the chamber $d$ at different points and that within the chamber they shall be brought together with sufficient force or violence to insure a thorough mingling together of the particles of fat and decomposing material, and it is also necessary in order to attain the best results that only so much fat shall enter the chamber $d$ as can be thoroughly acted on by the decomposing material entering simultaneously.

Our process can be carried on continuously, it being only necessary to keep up the supply of fat and decomposing matter, and more fat can be decomposed in a given time than in cases where charges of fat are decomposed and which necessarily makes the process intermittent.

Another advantage is that our process can be carried out without the use of large metallic decomposing-chambers, which are expensive and sometimes dangerous, and, further, the expense of the necessary heat required for decomposing a given quantity of fat by our process is much less than would be necessary to furnish the heat required to decompose the same quantity of fat by charges in large vessels.

Having described our invention, we claim—

1. The process herein described of decomposing fats, which consists in introducing under pressure into a closed chamber a current of fat and steam, and simultaneously introducing under pressure into said chamber an independent current of a decomposing agent at a different point, and causing said currents to meet within the chamber and become intimately mixed, and then conveying the mixture through a heated conduit to a separating-tank, substantially as set forth.

2. The process herein described of decomposing fats, which consists in introducing under pressure into a closed chamber a current of fat and steam, and simultaneously introducing under pressure into said chamber an independent current of steam and a decomposing material at a different point, and causing said currents to meet within the chamber and become intimately mixed, and then conveying the mixture through a heated conduit to a separating-tank, substantially as set forth.

3. The process herein described of decomposing fats, which consists in introducing under pressure into a closed chamber a current of fat and steam, and simultaneously introducing under pressure into said chamber an independent current of steam and an alkaline decomposing material at a different point, and causing said currents to meet within the chamber and become intimately mixed, and then conveying the mixture through a heated conduit to a separating-tank, substantially as set forth.

4. The process herein described of decomposing fats which consists in introducing under pressure into a closed chamber and in the form of a spray, a current of highly-heated fat, and simultaneously introducing under pressure into said chamber, also in the form of a spray, a current of highly-heated decomposing material at a different point, and in a direction to intersect the incoming spray of fat and thereby intimately mix them, and then conveying the mixture through a heated conduit to a separating-tank, substantially as described.

In testimony whereof we have signed our names to this specification in the presence of two subscribing witnesses.

FRITZ PERRELET.
KARL BECKER.

Witnesses:
MICHAEL VOLK,
ERWIN DIPPELY.